(12) United States Patent
Nuss

(10) Patent No.: US 11,109,186 B1
(45) Date of Patent: Aug. 31, 2021

(54) PROXIMITY-BASED MESSAGING

(71) Applicant: T-Mobile USA, Inc., Bellevue, WA (US)

(72) Inventor: Jeremy Nuss, Aurora, CO (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/890,515

(22) Filed: Jun. 2, 2020

(51) Int. Cl.
| | |
|---|---|
| *H04W 4/02* | (2018.01) |
| *H04W 4/14* | (2009.01) |
| *G06Q 50/00* | (2012.01) |
| *H04W 4/029* | (2018.01) |
| *H04W 4/021* | (2018.01) |

(52) U.S. Cl.
CPC ........... *H04W 4/023* (2013.01); *G06Q 50/01* (2013.01); *H04W 4/021* (2013.01); *H04W 4/029* (2018.02); *H04W 4/14* (2013.01)

(58) Field of Classification Search
CPC ....... H04W 4/023; H04W 4/14; H04W 4/021; H04W 4/029; G06Q 50/01
See application file for complete search history.

(56) References Cited

U.S. PATENT DOCUMENTS

| | | | |
|---|---|---|---|
| 8,014,763 B2 | 9/2011 | Hymes | |
| 10,390,191 B2 | 8/2019 | Nordstrom et al. | |
| 10,623,890 B1* | 4/2020 | Greenberger | H04L 51/24 |
| 2003/0037110 A1 | 2/2003 | Yamamoto | |
| 2011/0102459 A1* | 5/2011 | Hall | H04W 4/021 |
| | | | 345/633 |
| 2012/0008526 A1* | 1/2012 | Borghei | H04W 4/022 |
| | | | 370/254 |
| 2012/0254774 A1* | 10/2012 | Patton | H04L 51/20 |
| | | | 715/758 |
| 2017/0094456 A1* | 3/2017 | Manabe | H04W 4/10 |
| 2017/0294131 A1* | 10/2017 | Jedrzejewski | H04W 4/029 |
| 2020/0100058 A1* | 3/2020 | Given | H04W 12/02 |
| 2020/0358737 A1* | 11/2020 | Bastide | H04L 67/1046 |
| 2021/0133908 A1* | 5/2021 | Loflin | G06Q 10/02 |

* cited by examiner

*Primary Examiner* — Minjung Kim
(74) *Attorney, Agent, or Firm* — Brownstein Hyatt Farber Schreck, LLP

(57) ABSTRACT

Users of a proximity-based messaging system may be added to one or more proximity-based messaging groups that include users of user devices within an active area for the proximity-based messaging group and/or users meeting other criteria for being added to the group. Proximity-based messaging groups may be associated with events, such as music festivals, concerts, sporting events, and other gatherings and events. The active area of a proximity-based messaging group may correspond to a location of an event, an area surrounding an event, an area within an event location, and the like.

20 Claims, 8 Drawing Sheets

PROXIMITY-BASED MESSAGING

FIELD

Embodiments described herein relate to electronic device communication systems, and in particular, to proximity-based messaging as described herein.

BACKGROUND

Electronic communication devices are commonplace in today's society. Examples of electronic communication devices include mobile phones, tablet computers, laptop computers, electronic watches, and other types of devices that are capable of communicating with each other, with web servers, or with equipment connected to various types of networks. Users of electronic communication devices may communicate with other users via messaging applications. Conventional messaging applications typically require that a user possess another user's contact information for the user to be able to transmit a message to the other user.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

The embodiments described herein may include a method for providing proximity-based messaging. The method may include determining an active area for a proximity-based messaging group, determining a location of a user device associated with a user, and determining whether the location is within the active area. Responsive to determining that the location is not within the active areas, the method may include determining a direction of travel of the user device, determining, based on the direction of travel and the location, whether the user device is traveling toward the active area, and responsive to determining that the user device is traveling toward the active area, adding the user to the proximity-based messaging group.

Another embodiment may take the form of a method for providing proximity-based messaging. The method may include determining an active area for a proximity-based messaging group, determining a location of a user device associated with a user, and determining whether the location is within the active area. Responsive to determining that the location is not within the active areas, the method may include analyzing context information related to the user device, determining whether the context information meets criteria for adding the user to the proximity-based messaging group, and responsive to determining that the context information meets criteria for adding the user to the proximity-based messaging group, adding the user to the proximity-based messaging group.

Another embodiment may take the form of a method for providing proximity-based messaging. The method may include determining a first active area for a first device associated with a first user, determining a second active area for a second device associated with a second user, determining a first location of the first device, and determining whether the first location is in the second active area. Responsive to determining that the first location is in the second active area, the method may include determining a second location of the second device, determining whether the second location is in the first active area, and responsive to determining that the second location is in the first active area, adding the first user and the second user to a proximity-based messaging group.

BRIEF DESCRIPTION OF THE DRAWINGS

The disclosure will be readily understood by the following detailed description in conjunction with the accompanying drawings, wherein like reference numerals designate like structural elements.

The use of the same or similar reference numerals in different figures indicates similar, related, or identical items.

Figure 1:
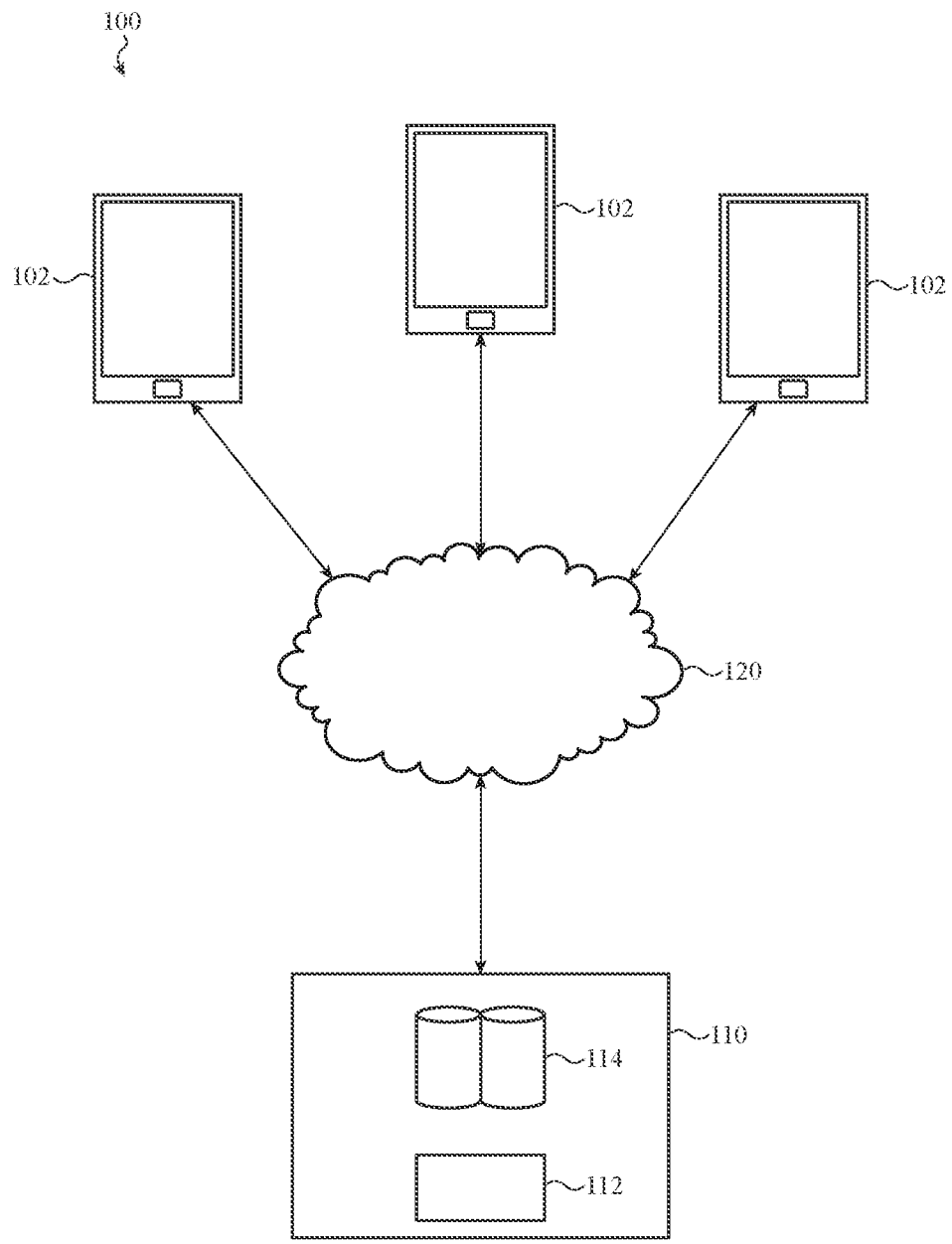
FIG. 1 is a high-level block diagram of an example proximity-based messaging system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the claims.

Embodiments of the present disclosure are directed to a proximity-based messaging system. The proximity-based messaging system may include user devices and a communication server that communicate with one another via a network, such as a wireless network or cellular network.

Users of the proximity-based messaging system may be added to one or more proximity-based messaging groups that include users of user devices within an active area for the proximity-based messaging group and/or users meeting other criteria for being added to the group. Proximity-based messaging groups may be associated with events, such as music festivals, concerts, sporting events, and other gatherings and events. The active area of a proximity-based messaging group may correspond to a location of an event, an area surrounding an event, an area within an event location, and the like.

The users that make up a proximity-based messaging group may be automatically determined based on information received from user devices, including device locations and context information (device speed and/or direction of movement, calendar appointments, social media information, and information from applications executing on the user devices).

As noted above, users within an active area for a proximity-based messaging group may be added to the proximity-based messaging group. Additionally or alternatively, users that are outside of the active area but are traveling toward the active area may be added to the proximity-based messaging group. In some cases, other context information about a user or a user device may be used to add a user to a proximity-based messaging group. For example, if a location associated with a calendar appointment or social media post of a user is within an active area for a proximity-based messaging group, the user may be added to the proximity-based messaging group.

These and other embodiments are discussed with reference to FIGS. 1-7. However, those skilled in the art will readily appreciate that the detailed description given herein with respect to these figures is for explanatory purposes only and should not be construed as limiting.

FIG. 1 is a high-level block diagram of an example proximity-based messaging system 100. The system 100 includes user devices 102 and a communication server 110. The system 100 also includes a network 120 that enables communication between the user devices 102 and the communication server 110. The user devices 102 may include one or more smartphones. Additionally or alternatively, the user devices 102 may include any other type of computing device, such as a desktop or laptop computer, a tablet, a cable box, a television, a video game console, and the like.

A user of the user device 102 interacts with the communication server 110 via an application, such as a web browser or a native application, to perform operations such as writing and sending messages to other users of the messaging system 100, or retrieving and reading messages sent by other users of the messaging system 100, and the like. For example, the application may be a messaging application executing on the user device 102. As another example, the application may be a web browser that loads a webpage provided by the communication server 110. Through functionality provided by the messaging application, the user reads and writes messages. The user device 102 may transmit messages to and receive messages from other users via the communication server 110, and the messages may be communicated through any of a variety of messaging protocols supported by the communication server 110. The messages may contain text, pictures, videos, attachments, and the like.

The user device 102 may also track and communicate various types of context information to the communication server 110. Examples of context information include non-messaging information, for example, a location of the user device 102, a direction and/or speed of travel of the user device 102, calendar appointments accessible on the user device 102, contacts accessible on the user device 102, and information from applications executing on the user device 102. The communication server 110 may also receive context information from other sources, including social media information received from social media services and the like.

The communication server 110 includes a messaging engine 112 and a user database 114. The messaging engine 112 provides functionality for receiving messages from and delivering messages to users of the messaging system 100. As noted above, the messaging engine 112 may provide functionality for receiving and delivering messages using any of a variety of messaging protocols, including web-chat (e.g., a chat application of a web-page hosted by the communication server 110), e-mail, extensible messaging and presence protocol (XMPP), short message service (SMS) texting, multimedia messaging service (MMS), mobile chat (e.g., via an application installed on a user device 102, chat services provided by gaming consoles, and application program interfaces (APIs) that third party application can use to send messages, among others).

In some cases, users may be presented with a list of other users with which they may communicate via the communication server 110. The list may be populated by contacts that the user has added or that have been automatically added based on information sent to the communication server 110. Additionally or alternatively, the list may include one or more users that are members of a proximity-based messaging group that includes the user. Users that are members of a proximity-based messaging group may communicate with one another, whether the users are strangers (e.g., have no prior connections to one another) or have some previous connection to one another. A message sent within a proximity-based messaging group may be group-wide, meaning all members can see it, or targeted, meaning it is sent only to one or more members of the group. For example, members of a proximity-based messaging group may be presented with a list of other members of the group, and may be able to send messages to one, some, or all of the other members. Users may be members of multiple proximity-based messaging groups.

Proximity-based messaging groups may be established by users or automatically based on a number of user devices 102 that are proximate to one another. Proximity-based messaging groups may have an associated active area, and user devices 102 within the active area may be members of the proximity-based messaging group. Proximity-based messaging groups may be associated with events, such as music festivals, concerts, sporting events, and other gatherings and events. The active area of a proximity-based messaging group may correspond to a location of an event, an area surrounding an event, an area within an event location, and the like.

The messaging engine 112 may automatically determine users that are members of a proximity-based messaging group. In some cases, the users that make up a proximity-based messaging group may be determined based on information received from user devices 102, including device locations, device movement information (e.g., speed and/or direction of movement), calendar appointments, and information from applications executing on the user devices.

The messaging engine 112 may analyze location information received from user devices 102 to automatically determine the members of a proximity-based messaging group based on their proximity to one another and/or their proximity to a reference location. The messaging engine 112 may determine an active area for a proximity-based messaging group, and may add one or more users whose user device 102 is within the active area to the proximity-based messaging group.

The messaging engine 112 may analyze movement information received from user devices 102 to automatically determine the members of a proximity-based messaging group. Movement information may include a direction of motion of the user device 102, a speed of motion of the user device 102, a route or destination from a navigation application, ride-share application, or other application executing on the user device 102, and the like. As one example, if a user device 102 is not within an active area for a proximity-based messaging group but is moving towards an active area, the user of the user device 102 may be added to the proximity-based messaging group. In some cases, the user may be added to the proximity-based messaging group only if the user device 102 is also within a predetermined distance of the active area. As another example, if a destination specified by an application of the user device 102 is within the active area, the user may be added to the proximity-based messaging group.

Additionally or alternatively to using location or movement information, the messaging engine 112 may use other information received from user devices 102 or retrieved from another location (e.g., a third-party server or the user database 114) to determine whether a user should be added to a proximity-based messaging group. For example, the messaging engine 112 may analyze calendar appointment information to determine whether a user is attending an event associated with a proximity-based messaging group, and if the user is attending the event, the messaging engine 112 may add the user to the proximity-based messaging group even if the user is not yet within the active area associated with the event. This may allow users to communicate about an event in advance of gathering for the event.

The messaging engine 112 may continuously update the members of a proximity-based messaging group. For example, as locations of user devices 102 and/or active areas change, the messaging engine 112 may determine which user devices 102 are within the active area. The messaging engine 112 may remove the users associated with user devices 102 from the proximity-based messaging group, and it may add users associated with user devices 102 that are newly within the active area to the proximity-based messaging group.

The user database 114 may store various types of information about the users of the proximity-based messaging system 100. Examples of information that may be stored for each user include one or more usernames for the user, one or more proximity-based messaging groups to which the user belongs, one or more email addresses for the user, one or more phone numbers for the user, a list of contacts for the user, messages sent and received by the user, calendar appointments for the user, user location information, and the like.

Figure 2A:
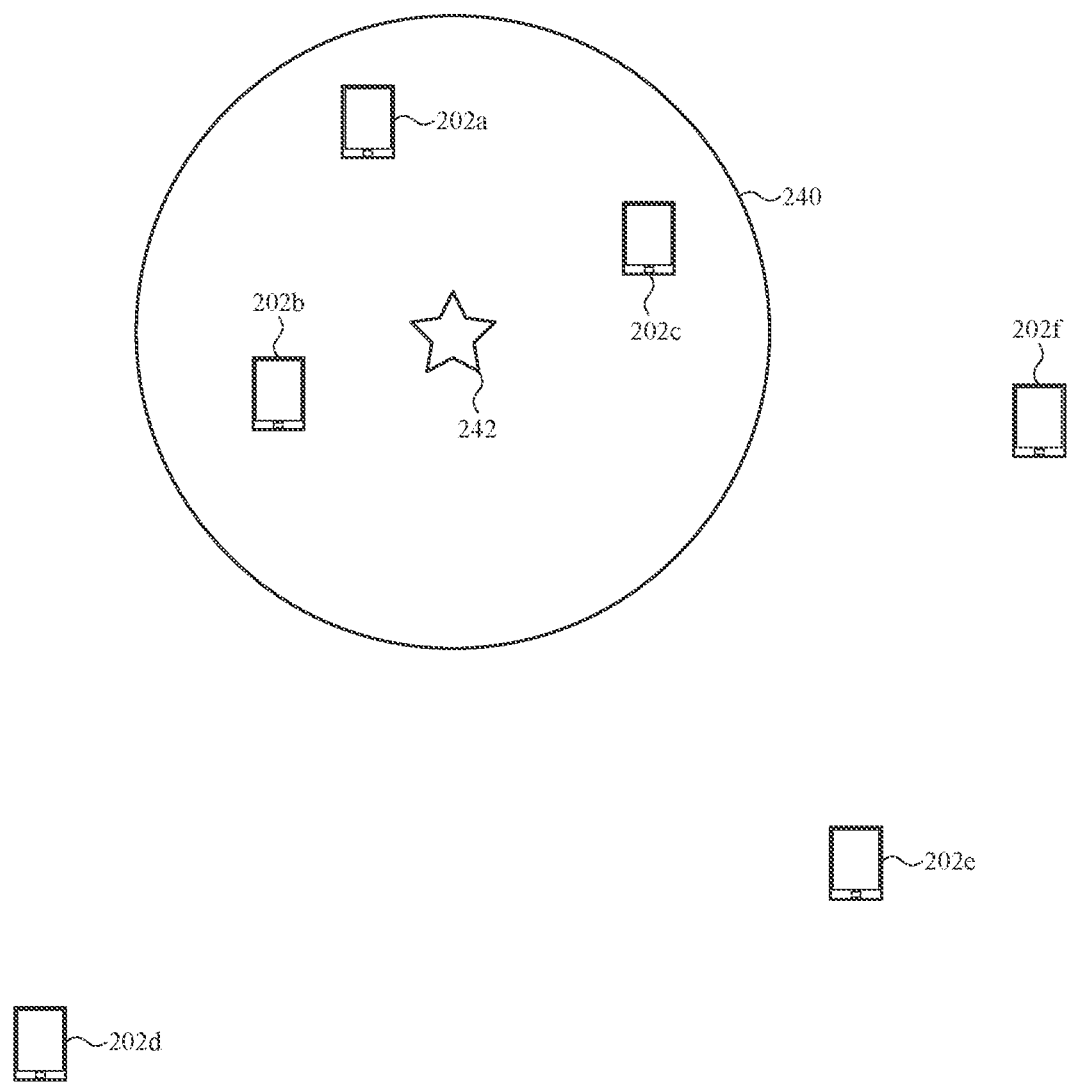
FIGS. 2A and 2B illustrate an example arrangement of user devices relative to an active area for a proximity-based messaging group.

FIG. 2A illustrates an example arrangement of user devices 202a-f relative to an active area 240 for a proximity-based messaging group. The user devices 202a, 202b, and 202c are within the active area 240. As a result, the messaging engine 112 may add the users of the user devices 202a, 202b, and 202c to the proximity-based messaging group. The user devices 202d, 202e, and 202f are outside the active area 240. As a result, users of the user devices 202d, 202e, and 202f may not be members of the proximity-based messaging group.

The active area 240 may be determined in any of a variety of ways. The active area 240 may be defined by geographic boundaries, buildings and structures, arbitrary boundaries, and/or other boundaries. For example, an active area 240 may be the area within a building or structure, the area within neighborhood or city limits, the area within a park or festival grounds, and the like. In some cases, users and/or administrators of the proximity-based messaging system may define the boundaries of an active area 240.

In some cases, the active area 240 may include all points within a certain distance of a reference point (e.g., reference point 242). The reference point 242 may be a location of a user device (e.g., a user device 102, 202), a location of another computing device, a static geographic location (e.g., defined by geographic coordinates), a building or structure, and the like. In some cases, the reference point 242 may move, and the active area 240 may change as the reference point moves.

In some cases, the reference point 242 is defined by a beacon (e.g., a BLUETOOTH beacon) or other static computing device that is capable of reporting its location to the communication server and/or communicating directly with user devices to determine a relative position. For example, the beacon may transmit a signal, and any user device 202 that receives the signal may be deemed to be in the active area 240.

In some cases, the location, size, and/or shape of an active area 240 may be automatically determined based on a number of user devices 202 in a surrounding environment. A location, size, and/or shape of the active area 240 may be determined such that the active area 240 contains a specified number of devices. For example, a distance from a reference point 242 may be determined such that an active area contains between 10 and 20 user devices. The location, size, and/or shape of an active area 240 may be updated automatically as user devices move in and out of the active area and/or as the specified number of devices changes.

Figure 2B:
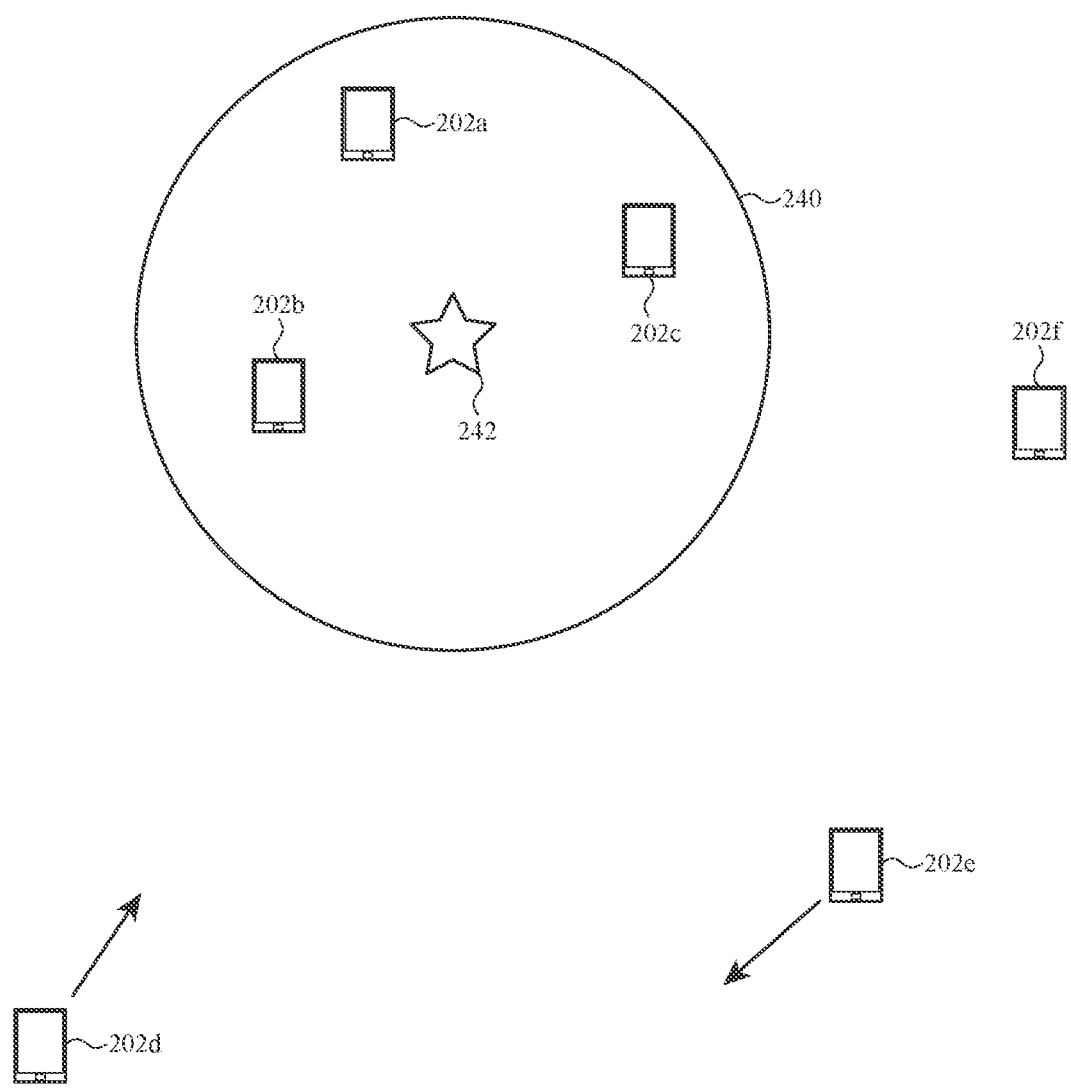

As noted above, the messaging engine may use movement information in addition to or instead of location information to determine the members of a proximity-based messaging group. FIG. 2B illustrates the arrangement of user devices 202 of FIG. 2A, in which some of the devices 202 are moving. As shown in FIG. 2B, the user device 202d is moving toward the active area 240, as indicated by the arrow. Even though the user device 202d is not within the active area 240, the messaging engine may add the user of the user device 202d to the proximity-based messaging group associated with the active area 240 because the user device 202d is moving toward the active area 240. In some cases, the messaging engine also determines whether the user device 202d is within a specified distance of the active area 240 before adding the user device 202d to the proximity-based messaging group. As shown in FIG. 2B, the user device 202e is also moving, but it is not moving toward the active area 240. As a result, the messaging engine may not add the user device 202e to the proximity-based messaging group.

Figure 3:
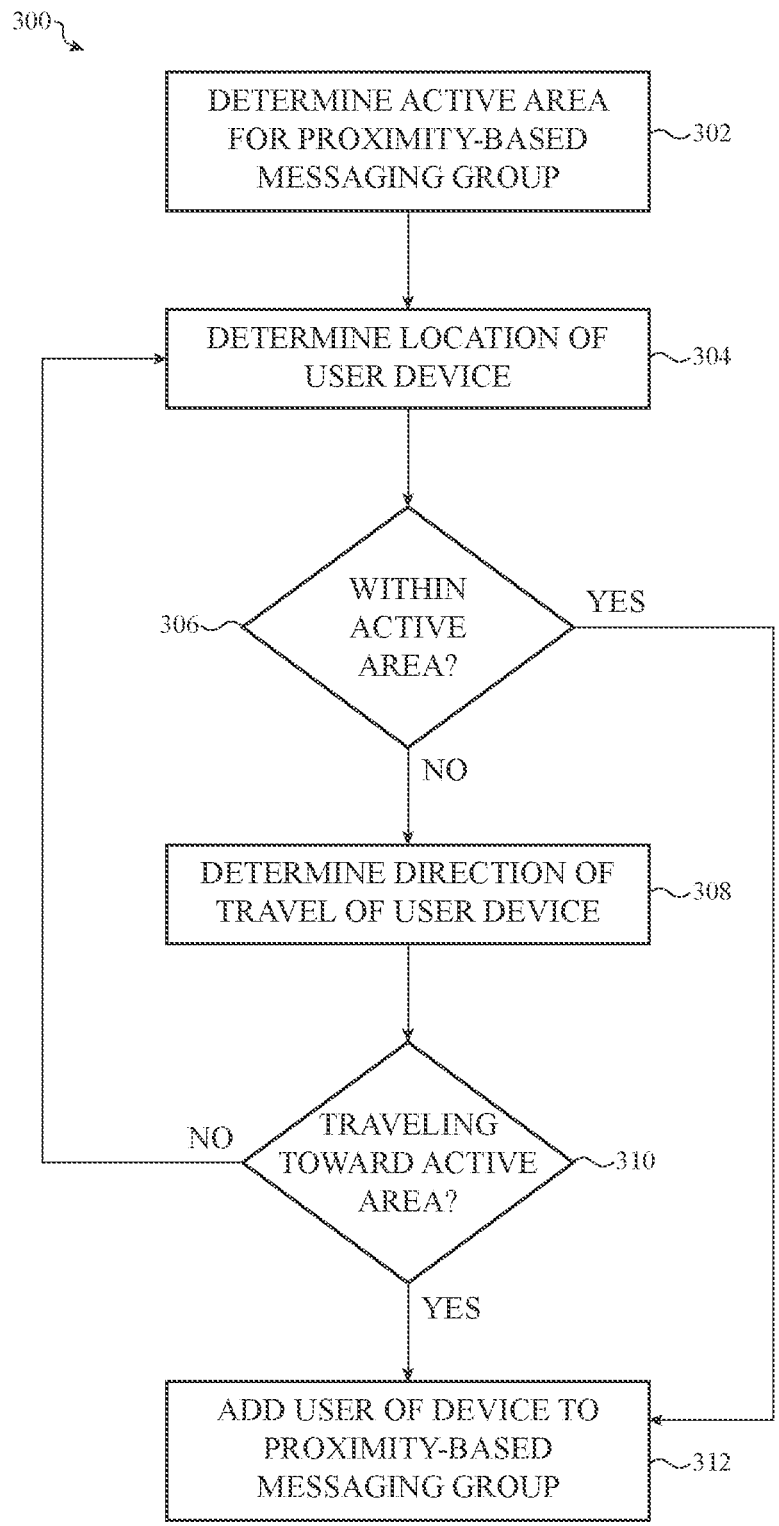
FIG. 3 is a flowchart depicting example operations of a method for adding a user of a user device to a proximity-based messaging group.

FIG. 3 is a flowchart depicting example operations of a method 300 for adding a user of a user device to a proximity-based messaging group. The method 300 may be performed by a communication server (e.g., the messaging engine 112 of the communication server 110) or another suitable electronic device.

At operation 302, the messaging engine determines an active area for a proximity-based messaging group. As noted above, the active area may be determined in any of a variety of ways. The active area may be defined by geographic boundaries, buildings and structures, arbitrary boundaries, and/or other boundaries. Additionally or alternatively, the active area may include all points within a certain distance of a reference point, such as a user device of a user in the proximity-based messaging group.

At operation 304, the messaging engine determines a location of a user device. The location of the user device may be determined using any suitable method, including by a GPS receiver of the user device, cellular network location determination (e.g., triangulation), wireless network location determination (e.g., using BLUETOOTH tracking devices), and the like. The user device may report its location to the communication server upon request from the communication server or at predetermined intervals.

At operation 306, the messaging engine determines whether the location of the user device is within the active area. If the location of the user device is within the active area, the method 300 proceeds to operation 312. If the location of the user device is not within the active area, the method 300 proceeds to operation 308.

At operation 308, the messaging engine determines a direction of travel of the user device. As noted above, user devices not within the active area may be added to a proximity-based communication channel if the user device is moving toward the active area. In some cases, the messaging engine determines whether the user device is within a predetermined distance of the active area prior to determining a direction of travel of the user device, and if the user device is not within the predetermined distance, the method may end or return to operation 304. The direction of travel may be determined by analyzing location data over time, analyzing compass data, analyzing data from an application executing on the user device (e.g., a navigation or ride-share app), or the like. In some cases, the messaging engine may additionally or alternatively determine other motion information of the user device, such as a speed of the user device.

At operation 310, the messaging engine determines whether the direction of travel and the location of the user device indicate that the user device is traveling toward the active area. If the user device is traveling toward the active area, the method 300 proceeds to operation 312. If the user device is not traveling toward the active area, the method 300 may end or return to operation 304. The messaging engine may additionally or alternatively determine whether other motion information meets criteria for adding the user to the proximity-based messaging group. For example, the messaging engine may determine whether a speed of the user device traveling towards the active area is above a threshold or is high enough that the user device will reach the active area within a specified time period or by a specified time (e.g., by the time an event starts).

At operation 312, the messaging engine adds the user of the user device to the proximity-based messaging group. Following operation 312, the messaging engine may continue to monitor a location and/or direction of travel of the user device. The messaging engine may remove the user from the proximity-based messaging group if the user device leaves the active area or if the direction of travel changes such that the user device is not traveling toward the active area.

In some cases, the steps of the method 300 may be performed as a batch process for multiple user devices. For example, the messaging engine may maintain or determine locations for multiple user devices, and may determine which of a set of devices are within the active area. For user devices within the active area, the messaging engine may add users of those devices to the proximity-based messaging group. For user devices outside of the active area, the messaging engine may determine which of the user devices are traveling toward the active area, and add users of those devices to the proximity-based messaging group.

Figure 4:
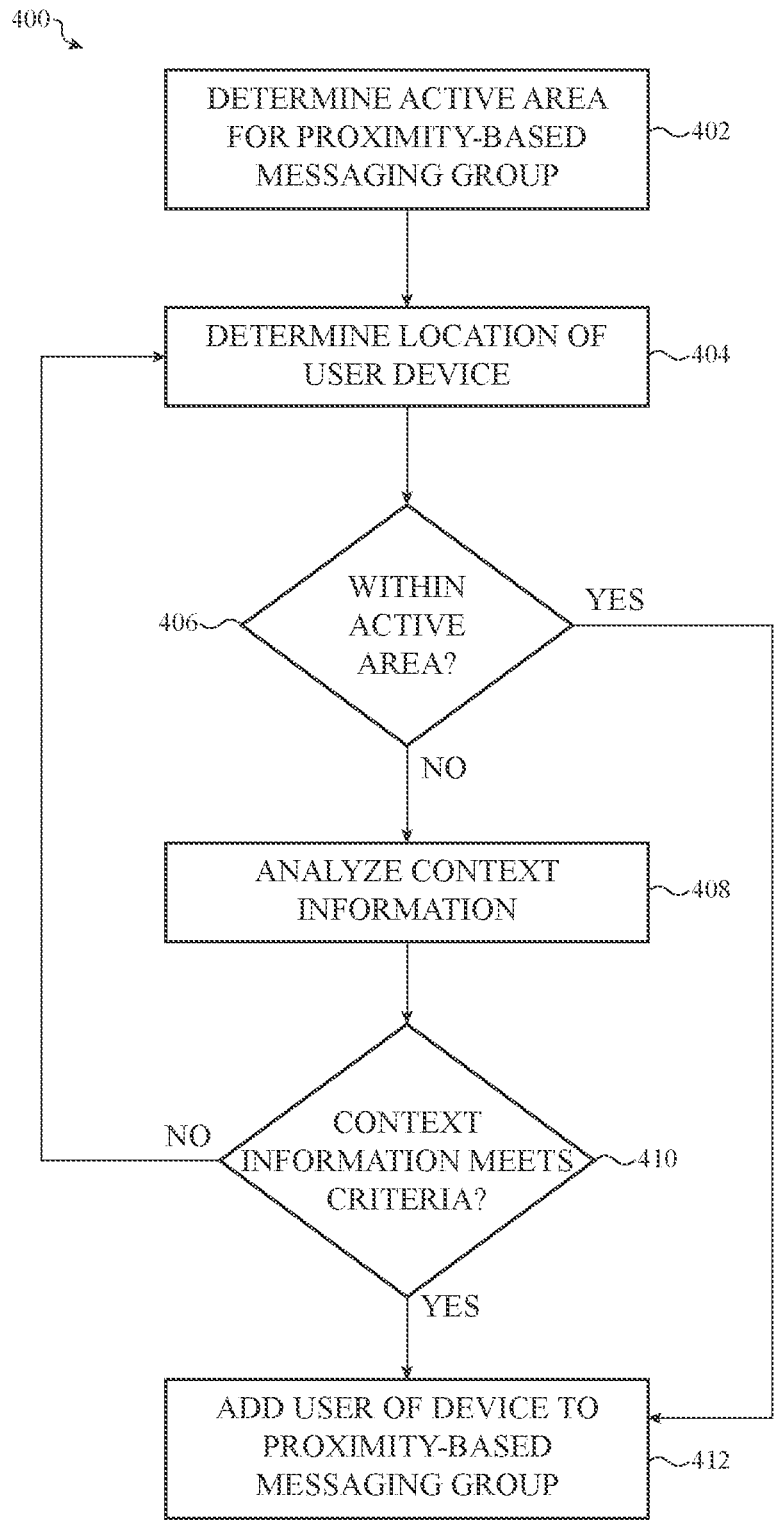
FIG. 4 is a flowchart depicting example operations of a method for adding a user of a user device to a proximity-based messaging group.

FIG. 4 is a flowchart depicting example operations of a method 400 for adding a user of a user device to a proximity-based messaging group. The method 400 may be performed by a communication server (e.g., the messaging engine 112 of the communication server 110) or another suitable electronic device.

At operation 402, the messaging engine determines an active area for a proximity-based messaging group. At operation 404, the messaging engine determines a location of a user device. At operation 406, the messaging engine determines whether the location of the user device is within the active area. If the location of the user device is within the active area, the method 400 proceeds to operation 412. If the location of the user device is not within the active area, the method 400 proceeds to operation 408. The details of operations 402, 404, and 406 are described in more detail above with respect to FIG. 3.

At operation 408, the messaging engine analyzes context information regarding the user device that may result in adding the user of the user device to the proximity-based messaging group even though the user device is not in the active area. Context information may include motion information, as discussed above with respect to FIG. 3. Context information may also include calendar appointments, social media information, contacts, and the like. User devices not within the active area may be added to a proximity-based communication channel if the context information meets certain criteria. In some cases, the messaging engine determines whether the user device is within a predetermined distance of the active area prior to determining context information, and if the user device is not within the predetermined distance, the method may end or return to operation 304. As noted above, context information may be received from the user device or from other services, such as third-party servers.

At operation 410, the messaging engine determines whether the context information meets certain criteria for adding the user of the user device to the proximity-based messaging group. If the context information meets the criteria, the method 400 proceeds to operation 412. If the user device is not traveling toward the active area, the method 400 may end or return to operation 404. Determining whether context information meets criteria may take many different forms. This may include determining whether calendar appointments, social media information, and the like indicates that a user will likely attend an event associated with the proximity-based messaging group. For example, if a user has a calendar appointment associated with the event, the messaging engine may determine that the user is likely to attend the event. As another example, if a hashtag or other content of a social media post by the user references the event, the messaging engine may determine that the user is likely to attend the event.

Additionally or alternatively, determining whether context information meets criteria may include determining whether calendar appointments, social media information, and the like indicates that a user will likely be within the active area the proximity-based messaging group in the future. For example, if a user has a calendar appointment with an associated location within the active area, the messaging engine may determine that the user is likely to be within the active area at or near the time of the calendar appointment. As another example, if a hashtag or other content of a social media post by the user references a location at least partially within the active area, the messaging engine may determine that the user is likely to be within the active area in the future.

At operation 412, the messaging engine adds the user of the user device to the proximity-based messaging group. Following operation 412, the messaging engine may continue to monitor a location and/or context information of the user and/or the user device. The messaging engine may remove the user from the proximity-based messaging group if the user device leaves the active area or if the context information no longer meets the criteria.

In some cases, the steps of the method 400 may be performed as a batch process for multiple user devices. For example, the messaging engine may maintain or determine locations for multiple user devices, and may determine which of a set of devices are within the active area. For user devices within the active area, the messaging engine may add users of those devices to the proximity-based messaging group. For user devices outside of the active area, the messaging engine may determine context information associated with the user devices, and add users of those devices to the proximity-based messaging group if the context information meets criteria for being added.

In embodiments in which the active area for a proximity-based messaging group is determined based on a proximity to a user device, different user devices may have different criteria for determining an active area. Each user device may have an associated active area (e.g., an area within a certain distance of the user device). In some cases, user devices that are candidates to be added to a common proximity-based messaging group may each have their own active area, and the users of the user devices may only be added to the proximity-based messaging group if each device is within an active area of the other.

Figure 5A:
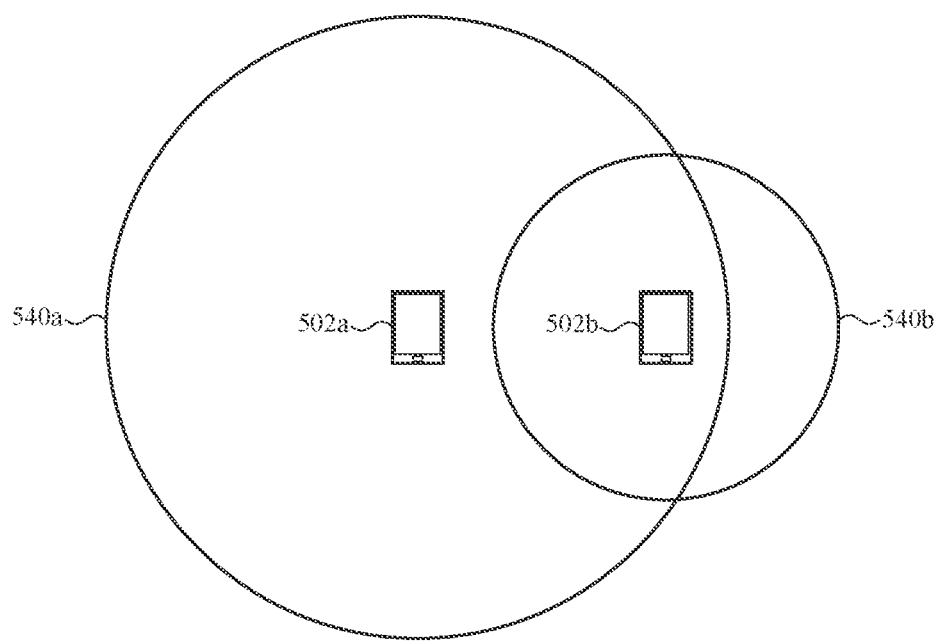
FIGS. 5A and 5B illustrate user devices and having respective active areas.
Figure 5B:
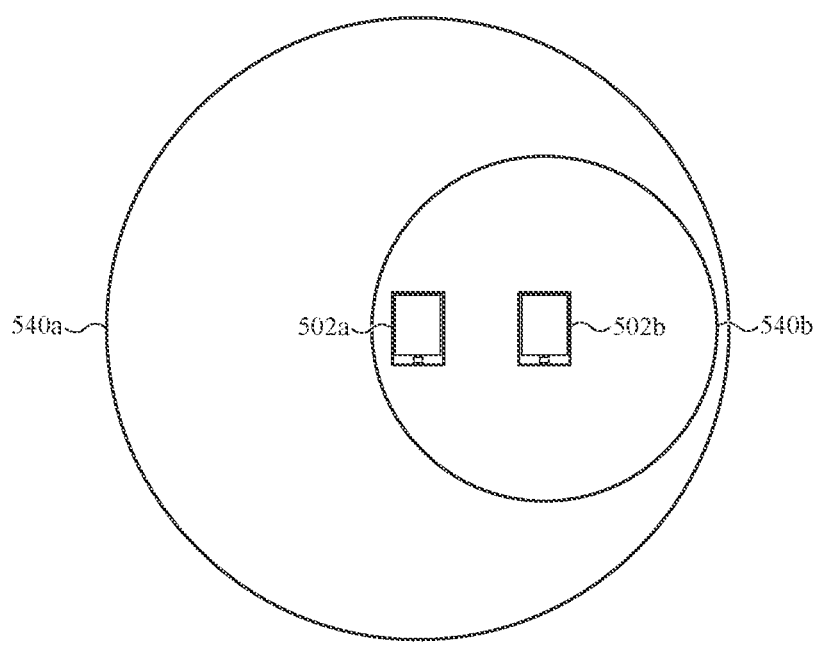

FIGS. 5A and 5B illustrate user devices 502a and 502b having respective active areas 540a, 540b. The user device 502a has an associated active area 540a. The user device 502b has an associated active area 540b. As shown in FIG. 5A, the user devices 502a, 502b may be positioned such that the user device 502b is within the active area 540a of the user device 502a, but the user device 502a is not within the active area 540b of the user device 502b. As shown in FIG. 5B, the user devices 502a, 502b may be positioned such that the user device 502b is within the active area 540a and the user device 502a is within the active area 540b.

In some cases, the messaging engine may only require that one of the user devices 502a, 502b is within the active area 540a, 540b of the other. In such a case, the users of the user devices 502a, 502b may be added to a proximity-based messaging group with one another in both the arrangement shown in FIG. 5A and the arrangement shown in FIG. 5B, because the user device 502b is within the active area 540a, regardless of whether the user device 502a is within the active area 540b. Alternatively, in some cases, the messaging engine may require that both user devices 502a, 502b must be within the active area 540a, 540b of the other. In such a case, the user devices 502a, 502b in the arrangement shown in FIG. 5A may not be added to a proximity-based messaging group with one another because the user device 502a is not within the active area 540b, and the user devices 502a, 502b in the arrangement shown in FIG. 5B may be added to a proximity-based messaging group with one another because each user device 502a, 502b is within the active area 540a, 540b of the other.

Figure 6:
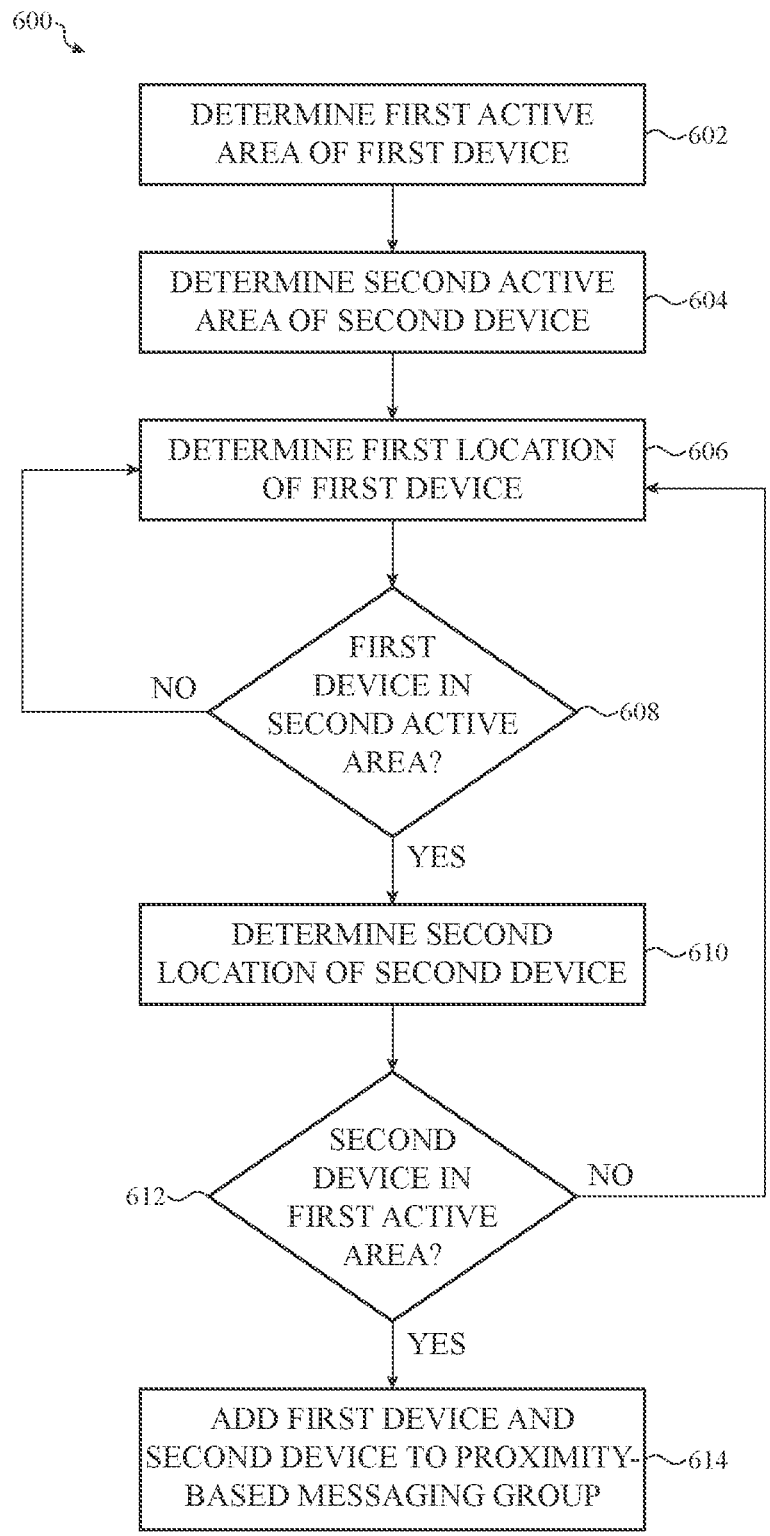
FIG. 6 is a flowchart depicting example operations of a method for adding users of a pair of user devices to a proximity-based messaging group with one another.

FIG. 6 is a flowchart depicting example operations of a method 600 for adding users of a pair of user devices to a proximity-based messaging group with one another. The method 600 may be performed by a communication server (e.g., the messaging engine 112 of the communication server 110) or another suitable electronic device. The method 600 is consistent with the situation discussed above with respect to FIGS. 5A and 5B, in which the messaging engine requires that both user devices must be within the active area of the other.

At operation 602, the messaging engine may determine a first active area of a first device. At operation 604, the messaging engine may determine a second active area of a second device. The first active area may include locations within a first distance of the first device. The second active area may include locations within a second distance of the first device. The first and second distances may be different, as shown in FIGS. 5A-5B above. In some cases, users may manually specify the first or second distance or otherwise specify the active area corresponding to their user device. In other cases, the active area for each device may be determined automatically by the messaging engine.

At operation 606, the messaging engine determines a first location of the first device. The first location may be determined as described above with respect to FIGS. 1-3. At operation 608, the messaging engine uses the first location to determine whether the first device is in the second active area. If the first device is not in the second active area, the method 600 may end or return to operation 606. If the first device is within the second active area, the method 600 may proceed to operation 610.

At operation 610, the messaging engine determines a second location of the second device. The second location may be determined as described above with respect to FIGS. 1-3. At operation 612, the messaging engine uses the second location to determine whether the second device is in the first active area. If the second device is not in the first active area, the method 600 may end or return to operation 606 or 610. If the second device is within the first active area, the method 600 may proceed to operation 614.

At operation 614, the messaging engine adds a first user of the first user device and a second user of the second user device to the proximity-based messaging group. Following operation 614, the messaging engine may continue to monitor the locations of the first user device and the second user device. The messaging engine may remove the user from the proximity-based messaging group if either user device leaves the other device's active area.

In some cases, additional users may be added to the proximity-based messaging group. For example, the messaging engine may identify a third device associated with a third user. The messaging engine may determine a third active area corresponding to the third device and a third location of the third device. The messaging engine may determine whether the third location is in the first active area and the second active area and if the first location and the second location are in the third active area. Responsive to determining that the third location is in the first active area and the second active area and if the first location and the second location are in the third active area, the messaging engine may add the third user to the proximity-based messaging group. If, on the other hand, the first location is in the third active area and the third location is in the first active area but either the third location is not in the second active area or the second location is not in the third active area, the messaging engine may not add the third user to the proximity-based messaging group. The messaging engine may instead add the first user and the third user to a separate proximity-based messaging group.

In some embodiments, one or more operations of the methods 300, 400, and 600 are omitted or performed in a different order. In some embodiments, additional or alternative operations that are not shown are performed as part of the methods 200, 300, 400, and 600.

One may appreciate that, although many embodiments are disclosed above, the operations and steps presented with respect to methods and techniques described herein are meant as exemplary and, accordingly, are not exhaustive. One may further appreciate that alternate step order or fewer or additional operations may be required or desired for particular embodiments.

Figure 7:
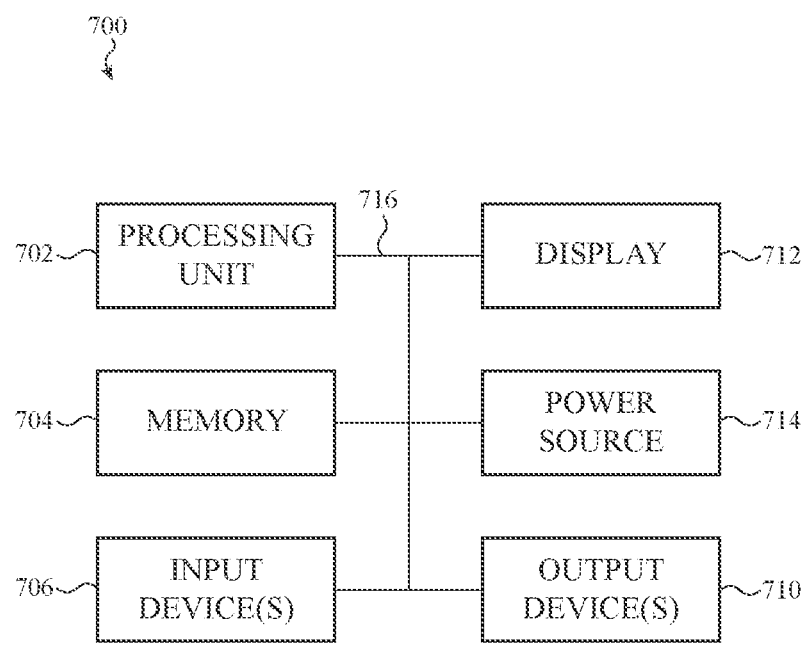
FIG. 7 shows a sample electrical block diagram of an electronic device.

FIG. 7 shows a sample electrical block diagram of an electronic device 700. The electronic device may in some cases take the form of any of the electronic devices described with reference to FIGS. 1-6, or other electronic devices. The electronic device 700 can include a display 712 (e.g., a light-emitting display), a processing unit 702, a power source 714, a memory 704 or storage device, an input device 706, and an output device 710.

The processing unit 702 can control some or all of the operations of the electronic device 700. The processing unit 702 can communicate, either directly or indirectly, with some or all of the components of the electronic device 700. For example, a system bus or other communication mechanism 716 can provide communication between the processing unit 702, the power source 714, the memory 704, the input device(s) 706, and the output device(s) 710.

The processing unit 702 can be implemented as any electronic device capable of processing, receiving, or transmitting data or instructions. For example, the processing unit 702 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 700 can be controlled by multiple processing units. For example, select components of the electronic device 700 (e.g., an input device 706) may be controlled by a first processing unit and other components of the electronic device 700 (e.g., the display 712) may be controlled by a second processing unit, where the first and second processing units may or may not be in communication with each other. In some cases, the processing unit 702 may determine a biological parameter of a user of the electronic device, such as an ECG for the user.

The power source 714 can be implemented with any device capable of providing energy to the electronic device 700. For example, the power source 714 may be one or more batteries or rechargeable batteries. Additionally or alternatively, the power source 714 can be a power connector or power cord that connects the electronic device 700 to another power source, such as a wall outlet.

The memory 704 can store electronic data that can be used by the electronic device 700. For example, the memory 704 can store electrical data or content such as, for example, audio and video files, documents and applications, device settings and user preferences, timing signals, control signals, and data structures or databases. The memory 704 can be configured as any type of memory. By way of example only, the memory 704 can be implemented as random access memory, read-only memory, Flash memory, removable memory, other types of storage elements, or combinations of such devices.

In various embodiments, the display 712 provides a graphical output, for example, associated with an operating system, user interface, and/or applications of the electronic device 700. In one embodiment, the display 712 includes one or more sensors and is configured as a touch-sensitive (e.g., single-touch, multi-touch) and/or force-sensitive display to receive inputs from a user. For example, the display 712 may be integrated with a touch sensor (e.g., a capacitive touch sensor) and/or a force sensor to provide a touch- and/or force-sensitive display. The display 712 is operably coupled to the processing unit 702 of the electronic device 700.

The display 712 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 712 is positioned beneath and viewable through a cover that forms at least a portion of an enclosure of the electronic device 700.

In various embodiments, the input devices 706 may include any suitable components for detecting inputs. Examples of input devices 706 include audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 706 may be configured to detect one or more particular types of input and provide a signal (e.g., an input signal) corresponding to the detected input. The signal may be provided, for example, to the processing unit 702.

As discussed above, in some cases, the input device(s) 706 include a touch sensor (e.g., a capacitive touch sensor) integrated with the display 712 to provide a touch-sensitive display. Similarly, in some cases, the input device(s) 706 include a force sensor (e.g., a capacitive force sensor) integrated with the display 712 to provide a force-sensitive display.

The output devices 710 may include any suitable components for providing outputs. Examples of output devices 710 include audio output devices (e.g., speakers), visual output devices (e.g., lights or displays), tactile output devices (e.g., haptic output devices), communication devices (e.g., wired or wireless communication devices), and so on, or some combination thereof. Each output device 710 may be configured to receive one or more signals (e.g., an output signal provided by the processing unit 702) and provide an output corresponding to the signal.

In some cases, input devices 706 and output devices 710 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 702 may be operably coupled to the input devices 706 and the output devices 710. The processing unit 702 may be adapted to exchange signals with the input devices 706 and the output devices 710. For example, the processing unit 702 may receive an input signal from an input device 706 that corresponds to an input detected by the input device 706. The processing unit 702 may interpret the received input signal to determine whether to provide and/or change one or more outputs in response to the input signal. The processing unit 702 may then send an output signal to one or more of the output devices 710, to provide and/or change outputs as appropriate.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A method for providing proximity-based messaging, the method comprising:
   determining an active area for a proximity-based messaging group;
   determining a location of a user device associated with a user;
   determining whether the location is within the active area;
   responsive to determining that the location is not within the active area:
      determining a direction of travel of the user device from an application executing on the user device other than a navigation application; and
      determining, based on the direction of travel and the location, whether the user device is traveling toward the active area; and
   responsive to determining that the user device is traveling toward the active area, adding the user to the proximity-based messaging group; wherein:
   a location, a size, and a shape of the active area are determined to contain a specified number of user devices within the active area, and
   the location, the size, and the shape of the active area are automatically updated when each of the specified number of user devices moves in and out of the active area and when the specified number of user devices changes.

2. The method of claim 1, wherein:
   the method further comprises, responsive to determining that the location is not within the active area, determining whether the user device is within a predetermined distance of the active area; and
   determining the direction of travel of the user device occurs responsive to determining that the user device is within the predetermined distance of the active area.

3. The method of claim 1, wherein:
   the location is a first location; and
   the method further comprises:
      after adding the user to the proximity-based messaging group, determining a second location of the user device;
      determining whether the second location is within the active area; and
      responsive to determining that the second location is not within the active area, removing the user from the proximity-based messaging group.

4. The method of claim 1, wherein the application is a rideshare application.

5. The method of claim 1, wherein:
   the user device is a first user device;
   the user is a first user;
   the location is a first location;
   the direction of travel is a first direction of travel;
   the method further comprises:
      determining a second location of a second user device associated with a second user; and
      determining whether the second location is within the active area;
      responsive to determining that the second location is not within the active area:
         determining a second direction of travel of the second user device; and
         determining, based on the second direction of travel and the second location, whether the second user device is traveling toward the active area; and responsive to determining that the second user device is traveling toward the active area, adding the second user to the proximity-based messaging group.

6. The method of claim 1, wherein:
the proximity-based messaging group is associated with an event; and
the active area corresponds to an event location.

7. The method of claim 1, further comprising, responsive to determining that the location is within the active area, adding the user to the proximity-based messaging group.

8. A method for providing proximity-based messaging, the method comprising:
determining an active area for a proximity-based messaging group;
determining a location of a user device associated with a user;
determining whether the location is within the active area; and
responsive to determining that the location is not within the active area:
analyzing context information related to the user device;
determining whether the context information meets criteria for adding the user to the proximity-based messaging group;
responsive to determining that the context information meets criteria for adding the user to the proximity-based messaging group, adding the user to the proximity-based messaging group;
determining a direction of travel of the user device from an application executing on the user device other than a navigation application;
determining, based on the direction of travel and the location, whether the user device is traveling toward the active area; and
responsive to determining that the user device is traveling toward the active area, adding the user to the proximity-based messaging group; wherein:
a location, a size, and a shape of the active area are determined to contain a specified number of user devices within the active area, and
the location, the size, and the shape of the active area are automatically updated when each of the specified number of user devices moves in and out of the active area and when the specified number of user devices changes.

9. The method of claim 8, wherein:
the location is a first location;
the context information is a calendar appointment; and
determining whether the context information meets criteria for adding the user to the proximity-based messaging group comprises determining whether a second location associated with the calendar appointment is within the active area.

10. The method of claim 8, wherein:
the location is a first location;
the context information is a social media post; and
determining whether the context information meets criteria for adding the user to the proximity-based messaging group comprises determining whether a second location associated with the social media post is within the active area.

11. The method of claim 8, wherein:
the context information is a social media post;
the proximity-based messaging group is associated with an event; and
determining whether the context information meets criteria for adding the user to the proximity-based messaging group comprises determining whether the social media post references the event.

12. The method of claim 8, wherein:
the method further comprises, responsive to determining that the location is not within the active area, determining whether the user device is within a predetermined distance of the active area; and
determining whether the context information meets criteria for adding the user to the proximity-based messaging group occurs responsive to determining that the user device is within the predetermined distance of the active area.

13. The method of claim 8, wherein:
the location is a first location; and
the method further comprises:
after adding the user to the proximity-based messaging group, determining a second location of the user device;
determining whether the second location is within the active area; and
responsive to determining that the second location is not within the active area, removing the user from the proximity-based messaging group.

14. The method of claim 8, further comprising, responsive to determining that the location is within the active area, adding the user to the proximity-based messaging group.

15. A method for providing proximity-based messaging, the method comprising:
determining a first active area for a first device associated with a first user;
determining a second active area for a second device associated with a second user;
determining a first location of the first device;
determining whether the first location is in the second active area;
responsive to determining that the first location is in the second active area:
determining a second location of the second device; and
determining whether the second location is in the first active area;
responsive to determining that the second location is in the first active area, adding the first user and the second user to a proximity-based messaging group;
responsive to determining that the first location is not within the second active area:
determining a direction of travel of the first device from an application executing on the first device other than a navigation application; and
determining, based on the direction of travel and the first location, whether the first device is traveling toward the second active area; and
responsive to determining that the first device is traveling toward the active area and that the second location is in the first active area, adding the first user and the second user to the proximity-based messaging group; wherein:
a location, a size, and a shape of the first active area are determined to contain a specified number of user devices within the first active area, and
the location, the size, and the shape of the first active area are automatically updated when each of the specified number of user devices moves in and out of the first active area and when the specified number of user devices changes.

16. The method of claim 15, further comprising:
after adding the first device and the second device to the proximity-based messaging group:
determining a third location of the first device; and
responsive to determining that the third location is not in the second active area, removing the first user from the proximity-based messaging group.

17. The method of claim 15, wherein:
the first active area comprises locations within a first distance of the first device; and
the second active area comprises locations within a second distance of the second device, the second distance different from the first distance.

18. The method of claim 17, wherein the first distance and the second distance are user-specified.

19. The method of claim 15, further comprising:
determining a third active area for a third device associated with a third user;
determining a third location of the third device;
responsive to determining that the third location is in the first active area and the second active area, and the first location and the second location are in the third active area, adding the third user to the proximity-based messaging group.

20. The method of claim 19, wherein:
the proximity-based messaging group is a first proximity-based messaging group; and
the method further comprises:
responsive to determining that the third location is in the first active area but not the second active area, and the first location is in the third active area, adding the first user and the third user to a second proximity-based messaging group.

* * * * *